(12) United States Patent
Bonacini

(10) Patent No.: US 7,455,096 B2
(45) Date of Patent: Nov. 25, 2008

(54) MACHINE FOR FITTING AND REMOVING TIRES AND WHEEL RIMS FOR VEHICLES

(75) Inventor: Maurizio Bonacini, Correggio (IT)

(73) Assignee: Giuliano S.p.A., Correggio (RE) (IT)

( * ) Notice: Subject to any disclaimer, the term of this patent is extended or adjusted under 35 U.S.C. 154(b) by 0 days.

(21) Appl. No.: 11/892,865

(22) Filed: Aug. 28, 2007

(65) Prior Publication Data

US 2008/0060766 A1 Mar. 13, 2008

(30) Foreign Application Priority Data

Sep. 8, 2006 (IT) .................. MO 2006 A 000273

(51) Int. Cl.
*B60C 25/138* (2006.01)
(52) U.S. Cl. ..................... 157/1.24; 157/1.17
(58) Field of Classification Search ............... 157/1.17, 157/1.22, 1.24, 1.28, 1.1
See application file for complete search history.

(56) References Cited

U.S. PATENT DOCUMENTS

| | | | | |
|---|---|---|---|---|
| 3,581,796 A | * | 6/1971 | Alm | 157/1.28 |
| 5,226,465 A | * | 7/1993 | Schon et al. | 157/1.28 |
| 6,422,285 B1 | * | 7/2002 | Gonzaga | 157/1.24 |
| 6,823,922 B2 | * | 11/2004 | Gonzaga | 157/1.3 |
| 7,089,987 B2 | * | 8/2006 | Gonzaga | 157/14 |
| 7,188,657 B2 | * | 3/2007 | Boni | 157/1.24 |
| 7,341,090 B2 | * | 3/2008 | Gonzaga | 157/1.17 |

FOREIGN PATENT DOCUMENTS

| | | |
|---|---|---|
| DE | 4415064 | 12/1994 |
| EP | 1475252 | 11/2004 |
| EP | 1625954 | 2/2006 |

OTHER PUBLICATIONS

English abstract of DE 4415064.

\* cited by examiner

*Primary Examiner*—David B Thomas
(74) *Attorney, Agent, or Firm*—Dykema Gossett PLLC

(57) ABSTRACT

A machine for removing and fitting tires and wheel rims for vehicles includes a supporting structure of clamping and rotating device for clamping and rotating the rim of a vehicle wheel around a rotation axis, at least one operating unit which is movably associated with the supporting structure and which includes at least one operating head for fitting and removing a tire onto/from the rim provided with a pushing body for pushing at least one portion of the side surface of the tire and with a grip tool for gripping at least one section of the tire bead, an actuator element for operating the sideways movement of the operating head with respect to the structure and guide means of such sideways movement along a substantially curvilinear direction between a first position, in which the operating head is substantially close to the clamping and rotating device and a second position, in which the operating head is substantially moved away from the clamping and rotating device.

30 Claims, 3 Drawing Sheets

MACHINE FOR FITTING AND REMOVING TIRES AND WHEEL RIMS FOR VEHICLES

FIELD OF THE INVENTION

The present invention refers to a machine for fitting and removing tires and wheel rims for vehicles.

BACKGROUND OF THE INVENTION

As is known, vehicle wheels generally include a metal rim having along the perimeter ring-shaped turn-ups between which the end portions, so-called "beads" of an elastic tire, are inserted fast up and adhered.

The use is currently known of so-called "tire changing" machines for removing and fitting tires from and onto their relevant rims for carrying out, for example, inner tube maintenance, repair or replacement jobs.

Such "tire changing" machines can be, for example, of the automatic type, and are essentially composed of a supporting frame for a clamping and rotating device for clamping and rotating the rim of a wheel onto/from which the tire must be fitted/removed and of an operating unit having an operating head for fitting and removing the tire.

Such operating head is, generally, equipped with a tool for fitting the tire on the rim and with a tool for removing the tire.

The removing tool, in particular, is arranged with substantially transversal direction with respect to the longitudinal axis of the operating head and has a curved end part which is turned towards the wheel to be removed during the course of the job.

The removing tool is, generally, supported by the operating head and can be turned around a fixed axis between a configuration for pushing a side of the tire and for clamping the corresponding bead and a configuration for entraining the tire in a direction away from the relevant rim.

During use, the end part of this tool is brought up against a side of the tire and pressed against this so as to move the tire bead away from the relevant turn-up, so as to allow the tool to fasten onto the edge of the tire for subsequent moving away from the rim.

These tire changing machines have a number of drawbacks, among which the not always perfect grip of the tool for the removal on the bead, with the risk of the tool jamming between the tire and the rim. In this case, the tool must be necessarily freed manually by an operator.

To overcome this problem, the use is known of tire changing machines in which the operating head includes a pushing body with a contact surface positionable against the side of a tire and a tool for the removal of the tire which is moving between a position in which it is housed inside the pushing body and a position in which it protrudes from the body to grip the tire bead.

During use, the operating head is brought close to the tire to be removed by means of a first actuator which operates horizontally, so that the contact surface of the pushing body comes up against the side of the tire, moving it from the rim and creating a passage for the tool.

The tool is then moved outside the pushing body and fitted between the tire and the rim to grip the tire bead.

Afterwards, the operating head is moved away from the rim by the combined action of the first actuator and of a second actuator that operates vertically, so as to drag the tire outside the rim.

These known machines are however susceptible to upgrading, especially in order to ensure a correct and easy removal of the tire while providing, at the same time, more simple structure and function. The need to control and combine several actuators during the removal stage in fact calls for the presence of a computer suitable for coordinating operations, with consequent increase in the overall complexity of the machine.

OBJECT OF THE INVENTION

The main aim of the present invention is to provide a machine for fitting and removing tires and wheel rims for vehicles that allows achieving the above upgrading.

Within the scope of such technical aim, another object of the present invention is to cater for the above aims with a simple structure, of relatively practical implementation, safe to use and with effective operation, as well as having a relatively low cost.

SUMMARY OF THE INVENTION

The above-described objects are all achieved by the present machine for removing and fitting tires and wheel rims for vehicles including a supporting structure of a clamping and rotating device for clamping and rotating the rim of a vehicle wheel around a rotation axis, at least one operating unit which is associated moving with the supporting structure and which includes at least one operating head for fitting and removing a tire onto/from the rim provided with a pushing body for pushing at least one portion of the side surface of the tire and with a grip tool for gripping at least one section of the bead of said tire, wherein the machine includes an actuator element for operating the sideways movement of the operating head with respect to the structure and guide means of the sideways movement along a substantially curvilinear direction between a first position, in which the operating head is substantially close to the clamping and rotating device and a second position in which the operating head is substantially moved away from the clamping and rotating device.

BRIEF DESCRIPTION OF THE DRAWINGS

Further characteristics and advantages of the present invention will appear even more evident from the detailed description of a preferred, but not exclusive, embodiment of a machine for fitting and removing tires and wheel rims for vehicles, illustrated indicatively by way of non limiting example, in the attached drawings wherein.

DETAILED DESCRIPTION OF THE PREFERRED EMBODIMENT(S)

Figure 1:
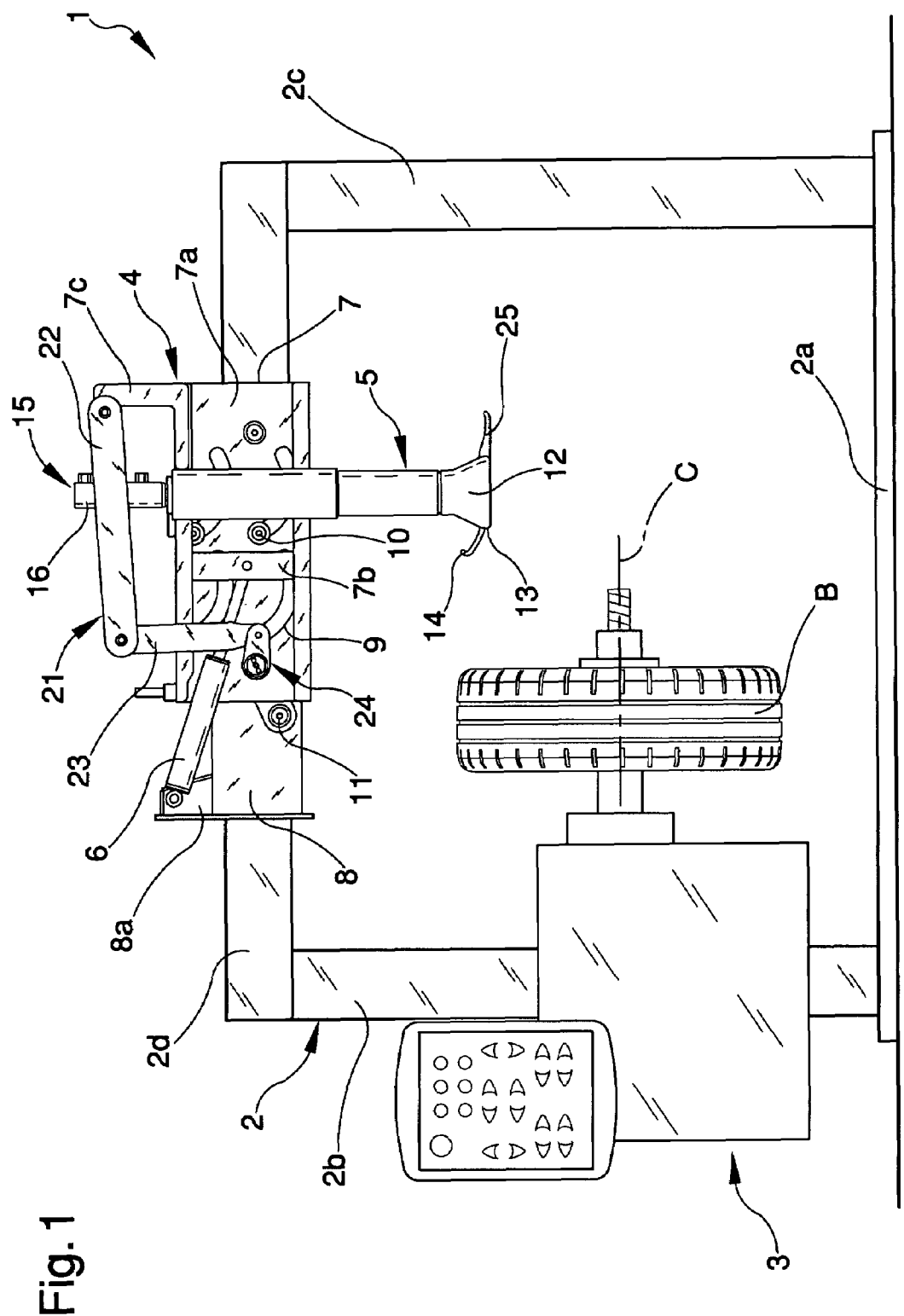
FIG. 1 is a side view of the machine according to the invention.

With particular reference to such figures, a machine for fitting and removing tire and wheel rims for vehicles has been globally indicated by 1.

The machine 1 includes a supporting structure 2 for supporting a clamping and rotating device 3 for clamping and rotating a rim A onto/from to mount/remove a tire B around a substantially horizontal rotation axis C.

An operating unit 4 is movably supported by the structure 2 and is provided with an operating head 5 for mounting and/or removing the tire B onto/from the rim A.

In particular, the structure 2 includes a base 2a from which elevate a first and a second upright 2b and 2c distanced from each other and supporting a transom 2d arranged above the clamping and rotating device 3 and to which the operating unit 4 is movably associated. The clamping and rotating device 3 is supported by the first upright 2b and can be moved therealong by a height adjustment device, such as a motor device, a fluid actuator, or the like.

Alternatively, the machine 1 can have a structure 2 otherwise structured and/or the arrangement of the rotation axis C substantially vertical or tilted.

The adjustment of the height of the clamping and rotating device 3 permits the correct positioning of the operating head 5 before the fitting/removal stage and according to the specific dimensions of the wheel and the associated tire B.

Advantageously, the machine 1 includes an actuator element 6 for moving the operating head 5 with sideways movement with respect to the structure 2 and guide means for such sideways movement along a substantially curvilinear direction between a first position in which the operating head 5 is substantially close to the clamping and rotating device 3 and a second position in which the operating head 5 is substantially further from the clamping and rotating device 3.

In particular, the operating unit 4 includes a supporting slide 7 supporting the operating head 5, associated with the structure 2 and moving along the above curvilinear direction. In particular, the slide 7 is associated with the transom 2d by interposition of a carriage 8 movable by means of a motor device along the transom 2d.

The guide means includes a plurality of curvilinear slots 9 defined on a substantially vertical side wall 7a of the slide 7 and inside which corresponding pins 10 secured on a side wall of the carriage 8 are slidingly engaged.

Usefully, each of the curvilinear slots 9 describes a circle arc with the convexity turned towards the clamping and rotating device 3.

A different number, arrangement and/or conformation of the curvilinear slots 9 and of the respective pins 10 cannot however be ruled out.

The actuator element 6 is composed of a first linear actuator of the type, for example, of an actuator by fluid means, which has one end hinged to the carriage 8 and the opposite end hinged to the slide 7. The straight alternate movement of the first actuator 6 permits the movement of the slide 7 between the first and the second position with relative sliding of the pins 10 inside the curvilinear slots 9.

In particular, the first actuator 6 is arranged substantially sloping with respect to the rotation axis C and has an end hinged to a fin 8a that extends at the top from the carriage 8 and the opposite end hinged to a bridge 7b defined on the slide 7 and substantially parallel to the wall 7a.

Advantageously, the guide means includes a pair of connecting rods 11 distanced from one another, placed in between the carriage 8 and the slide 7 and suitable for supporting the slide 7 during the sideways movement.

Figure 2:
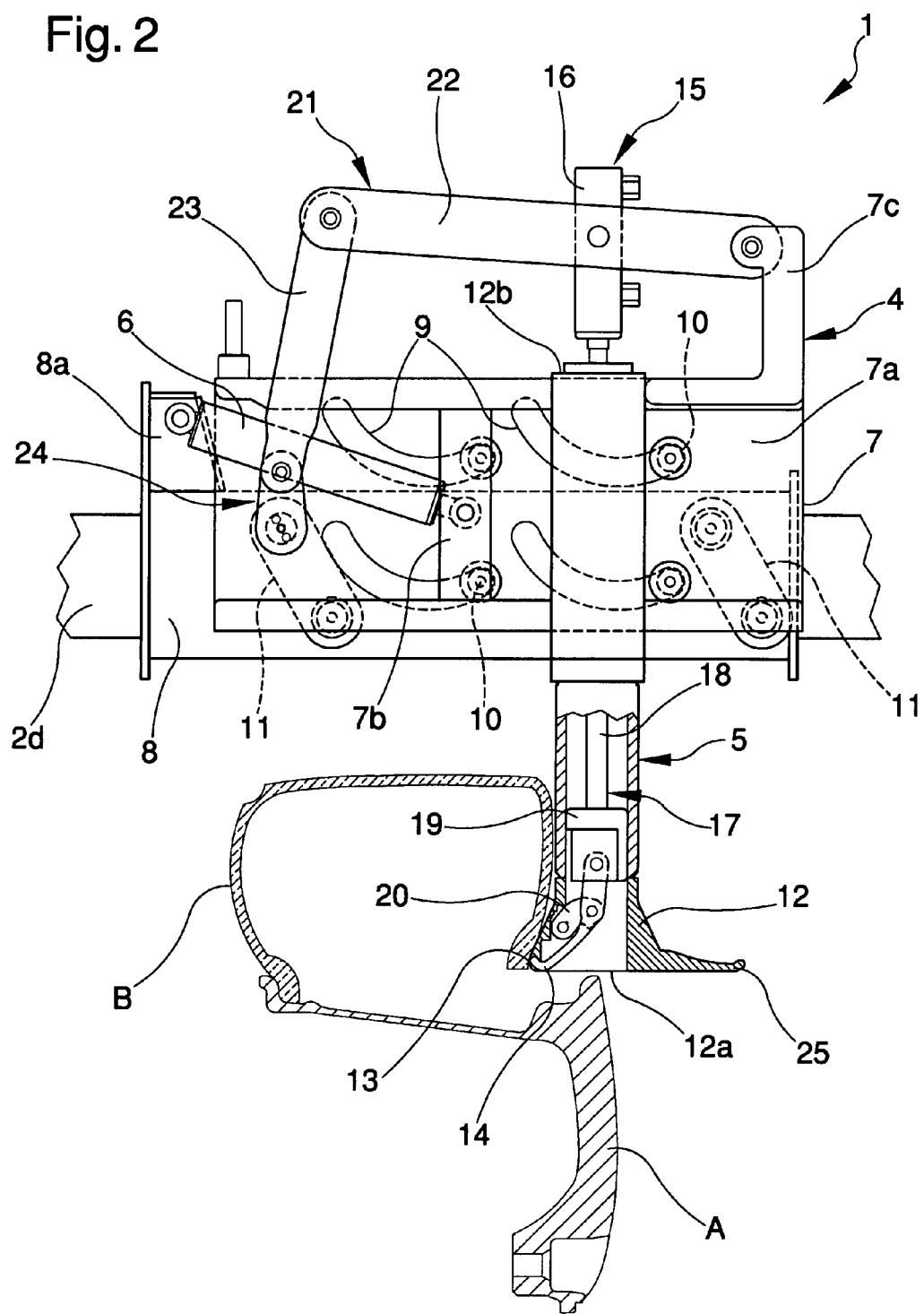
FIGS. 2, 3 and 4 are side views of a detail of the machine according to the invention that illustrate three distinct phases of the process of tire removal from a vehicle wheel.

The operating head 5 has a pushing body 12 with a substantially tubular shape that is vertically arranged above the clamping and rotating device 3 and which has a contact surface 13 positionable in contact with a portion of the side surface of the tire B during the removal stage (FIG. 2).

In particular, the contact surface 13 is defined at the lower open end of the pushing body 12 and is shaped substantially protruding towards the tire B.

The operating head 5 also includes a grip tool 14 of at least one section of the bead of the tire B which is alternately moving between an idle position in which it is fully housed inside the pushing body 12, at its lower end (FIG. 2), an intermediate fitting position in which it is at least partially protruding from the pushing body 12 through the lower opening 12a (FIG. 3), and an entrainment position of the tire B in which it is protruding from the pushing body 12 and substantially sloped towards the contact surface 13.

The operating unit 4 has a movement device 15 for moving the grip tool 14 between the above-mentioned idle and fitting positions; the movement device 15 includes a linear second actuator 16 of the type, for example, of an actuator by fluid means arranged above the pushing body 12.

The movement device 15 also includes a drive element 17 made up of a rod 18 axially slidingly fitted inside the pushing body 12 through an upper opening 12b. The rod 18 is associated at one end with the second actuator 16 and is equipped at the opposite end with a small cylinder 19 sliding to measure inside the pushing body 12, close to the lower opening 12a.

The grip tool 14 has one end hinged to the small cylinder 19 and a small connecting rod 20 is placed in between one substantially median portion of the grip tool 14 and the pushing body 12, inside this.

The small connecting rod 20 is suitably sized and shaped to guide the tool, together with the small cylinder 19 piloted by the second actuator 16, in a combined rotary-sideways movement between the idle position and the intermediate fitting position.

Usefully, the grip tool 14 has a substantially elongated shape and has the free end provided with a substantially hooked end section suitable for locating itself on the inner surface of the bead of the tire B to entrain the bead itself during the removal stage.

Advantageously, the machine 1 includes drive means 21 for conveying the sideways movement of the slide 7 to the grip tool 14: such drive means 21 are suitable for moving the grip tool 14 between the intermediate fitting position and the entrainment position in a synchronous way with respect to the sideways movement of the slide 7.

In particular, the drive means 21 are made up of a system of levers associated with the carriage 8 and with the slide 7 and suitable for supporting the second actuator 16 and moving this along a substantially vertical direction.

The system of levers 21 includes a first lever 22 that has an end hinged to an appendix 7c of the slide 7 protruding vertically and upwards and the opposite end hinged to a second lever 23.

The first lever 22 is arranged substantially horizontally and supports the second actuator 16 near the upper end of the pushing body 12.

In particular, the second actuator 16 is hinged at a substantially median section of the first lever 22 and moves through the action of the first lever 22 in a substantially vertical direction moving closer and away with respect to the pushing body 12, at the upper opening 12b.

The second lever 23 has the end opposite the first lever 22 hinged to a third lever 24.

The third lever 24 has the end opposite the second lever 23 hinged to the carriage 8 and is hinged at a substantially median section of the slide 7.

Advantageously, one of the small connecting rods 11 can coincide with the section of the third lever 24 placed in between the carriage 8 and the slide 7.

The first, the second and the third levers 22, 23 and 24 are suitably sized and shaped to allow, in the transit between the first and the second position of the operating head 5, the moving of the second actuator 16 close to the pushing body 12, with consequent sliding of the drive element 17 towards the lower opening 12a and further movement of the grip tool 14 from the intermediate fitting position to the entrainment position.

Usefully, the operating head 5 has a supporting tool 25 for supporting the tire B, suitable for intervening during the removal stage to entrain the tire B away from the rim A and, during the fitting stage, to position it on the rim A. The supporting tool 25 is made of a plate which is associated integral at the lower end of the pushing body 12 and is arranged overhanging on the opposite side with respect to the contact surface 13.

The operation of the invention is as follows.

With particular reference to the removal stage, the operator positions the wheel on the clamping and rotating device 3 and regulates the height according to the dimensional and constructive characteristics of the rim A.

The operating unit 4 is initially positioned with the operating head 5 in first position, detached from the tire B and with the grip tool 14 in idle position.

Subsequently, the operating head 5 is suitably positioned, by sliding the carriage 8 on the transom 2d, so the contact surface 13 enters into contact with the side of the tire B moving it from the rim A and creating a passage for the grip tool 14 (FIG. 2).

Figure 3:
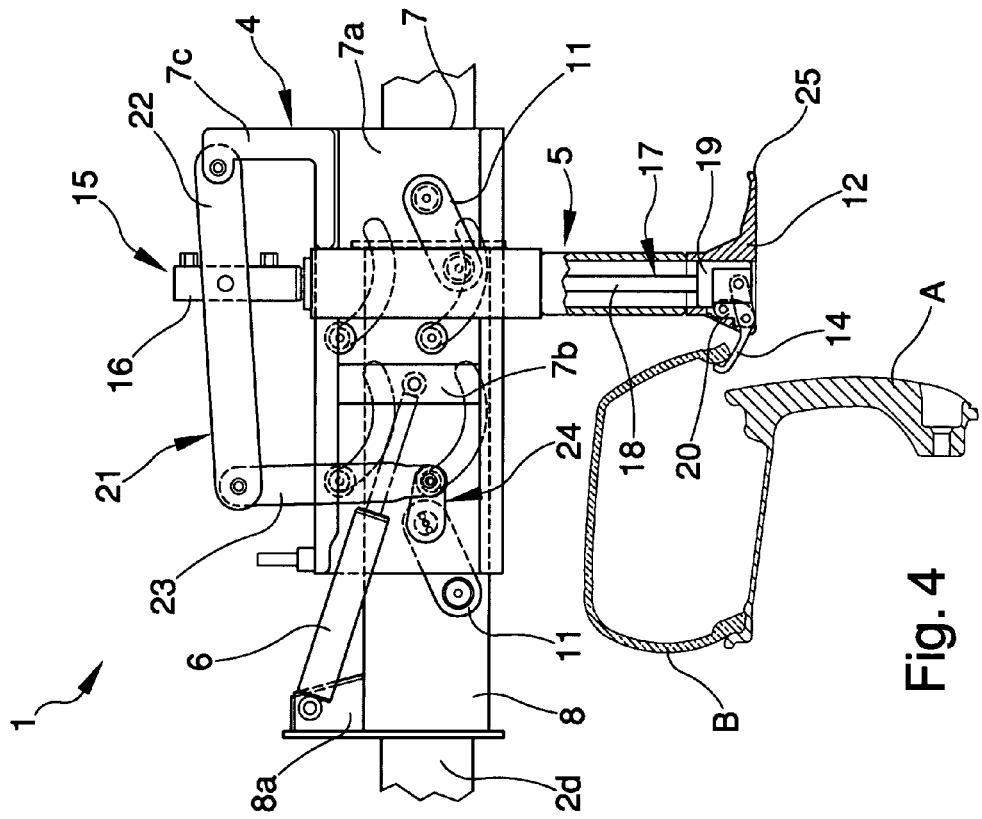
Figure 4:
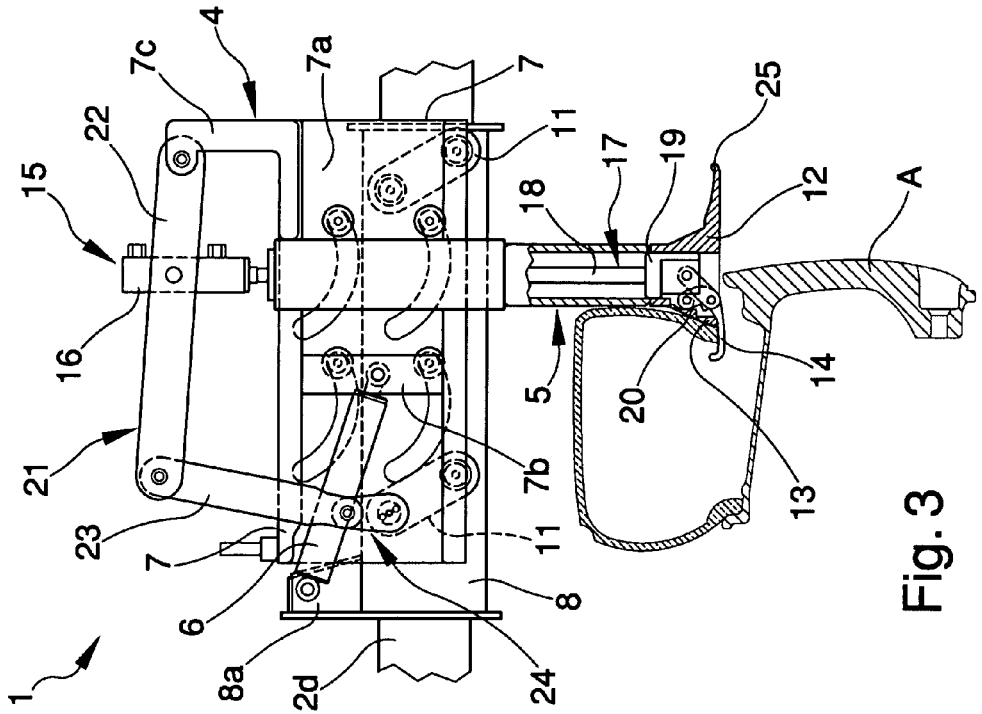

The operation of the second actuator 16 takes the grip tool 14 into the intermediate fitting position: the grip tool 14 fits in between the B and the rim A and with the free hooked end grips the bead of the tire B internally (FIG. 3).

Subsequently, always by means of the operation of the first actuator 6, the operating head 5 is moved sideways from the first position towards the second position. The relative sliding of the pins 10 inside the curvilinear slots 9 allows guiding the sideways movement of the operating unit 14, and therefore of the operating head 5, along a substantially curvilinear direction, permitting first of all the simultaneous lifting and moving away from the rim A of the bead of the tire B gripped by the grip tool 14, then the simultaneous lowering and moving away of the bead from the rim A as far as the second position.

During such sideways movement, the system of levers 21 conveys the movement of the slide 7 to the second actuator 16, which gradually moves closer to the upper opening 12b of the pushing body 12, further moving the drive element 17 towards the lower opening 12a and moving the grip tool 14 from the intermediate fitting position towards the entrainment position. This movement of the grip tool 14 permits maintaining a perfect grip on the bead of the tire B during the downward phase of the sideways movement of the operating head 5.

With the rotation of the rim A, operated by the clamping and rotating device 3, the tire B is completely taken off for subsequent detachment.

During the fitting stage, on the other hand, the tire B is raised near to the rim A already fixed to the clamping and rotating device 3 and the relative beads are housed on the rim A by means of the operation of the supporting tool 25.

It has in fact been ascertained how the described invention achieves the proposed objects and in particular the fact is underlined that the presence of just one actuator suitable for moving the operating head allows considerably simplifying the structure and the configuration phases of the machine.

Furthermore, the curvilinear sideways movement of the operating head, together with the movement of the grip tool between the intermediate fitting position and the entrainment position, permits moving the tire bead away from the rim and reducing to the utmost the stresses that could damage the tire itself.

A further advantage is provided by the presence of the system of levers which permits the movement of the tool in a synchronous way with respect to the sideways movement of the operating head, avoiding at the same time the use of supplementary actuators.

The invention thus conceived is susceptible of numerous modifications and variations, all of which falling within the scope of the inventive concept.

Furthermore all the details may be replaced by other elements which are technically equivalent.

In practice, the materials used, as well as the contingent shapes and dimensions, may be any according to requirements without because of this moving outside the protection scope of the following claims.

The invention claimed is:

1. A machine for removing and mounting a tire relative to a vehicle wheel rim, said machine comprising:
   a supporting structure,
   a clamping and rotating device mounted on said supporting structure for clamping and rotating a wheel rim around a rotating axis,
   an operating unit which comprises:
      a carriage which is movably mounted on said support structure,
      a slide which is movably mounted on said carriage,
      an actuator for moving said slide relative to said supporting structure,
      a guide means for guiding movement of said slide relative to said carriage along a substantially curvilinear path, said guide means comprising a connecting rod positioned between said slide and said carriage, and
      an operating head which includes a pushing body for pushing a portion of a side surface of the tire, and a grip tool for gripping one section of a bead of the tire, said guide means guiding the operating head between first and second positions located respectively closer and farther from said clamping and rotating device.

2. A machine according to claim 1, wherein said pushing body comprises at least one contact surface positionable against said portion of side surface of the tire and said grip tool moves between an idle position in which it is at least partially housed inside said pushing body, an intermediate fitting position in which it is at least partially protruding from said pushing body, and an entrainment position in which it is protruding from said pushing body and is substantially sloped towards said contact surface for the entrainment of said tire.

3. A machine according to claim 2, comprising movement device of said grip tool between said idle position and said intermediate fitting position.

4. A machine according to claim 3, wherein said movement device comprise a small connecting rod that has one end hinged along a substantially median portion of said grip tool and the opposite end hinged to said pushing body.

5. A machine according to claim 3, wherein said movement device comprise at least a linear second actuator.

6. A machine according to claim 5, wherein said movement device comprise a drive element with a substantially elongated shape that is associated with said second actuator and that is arranged sliding inside said pushing body.

7. A machine according to claim 6, wherein said grip tool has an end hinged to said drive element.

8. A machine according to claim 5, wherein said second actuator is a fluid actuator.

9. A machine according to claim 2, comprising drive means for conveying the sideways movement of said operating head to said grip tool and suitable for moving said grip tool between said intermediate fitting position and said entrainment position.

10. A machine according to claim 9, wherein said drive means comprise at least one system of levers.

11. A machine according to claim 10, wherein said system of levers comprises a first lever which has one end hinged to a second lever and the opposite end hinged to a supporting slide of said operating head, associated with said supporting structure moving along said above curvilinear direction.

12. A machine according to claim 11, wherein said first lever supports a linear second actuator of a movement device of said grip tool between said idle position and said intermediate fitting position.

13. A machine according to claim 11, wherein said first lever is arranged substantially parallel to said rotation axis.

14. A machine according to claim 11, wherein said second lever has the end opposite said first lever hinged to a third lever.

15. A machine according to claim 14, wherein said third lever has the end opposite said second lever hinged to a supporting carriage of said slide associated moving with said structure, and is hinged to said slide along a substantially median section.

16. A machine according to claim 15, wherein the section of said third lever placed in between said carriage and said slide coincide with a connecting rod placed in between said carriage and said slide.

17. A machine according to claim 2, wherein said contact surface is shaped substantially protruding towards said clamping and rotating device.

18. A machine according to claim 2, wherein said grip tool is fully housed inside said pushing body in said idle position.

19. A machine according to claim 2, wherein said grip tool has a substantially elongated shape and has a free end provided with a substantially hooked end section and suitable for locating itself on the inner surface of said tire.

20. A machine according to claim 1, wherein said guide means comprise at least one curvilinear slot defined in one of said slide and said carriage, and pin which extends through said slot and engages a second of said slide and said carriage.

21. A machine according to claim 20, wherein said curvilinear slot has the convexity turned towards said clamping and rotating device.

22. A machine according to claim 20, wherein said curvilinear slot is defined on at least one substantially vertical wall of said slide.

23. A machine according to claim 20, wherein said guide means comprise a plurality of said curvilinear slots and of corresponding pins.

24. A machine according to claim 1, wherein said carriage is movable along a transom of said structure arranged above said clamping and rotating device.

25. A machine according to claim 1, wherein said actuator element is placed in between said carriage and said slide.

26. A machine according to claim 1, wherein said actuator element is composed of a first actuator of the linear type.

27. A machine according to claim 26, wherein said first actuator is a fluid actuator.

28. A machine according to claim 1, wherein said pushing body is substantially tubular.

29. A machine according to claim 1, wherein said pushing body is arranged substantially transversal with respect to said rotation axis.

30. A machine according to claim 1, wherein said rotation axis is substantially horizontal.

* * * * *